United States Patent
Murayama et al.

(10) Patent No.: US 7,103,263 B1
(45) Date of Patent: Sep. 5, 2006

(54) PROGRAM RECEIVER AND METHOD OF DISPLAY PROCESSING OF PROGRAM EXPLANATION SCREEN

(75) Inventors: Naoki Murayama, Tokyo (JP); Ichiro Hamada, Kanagawa (JP); Tatsuya Wakahara, Tokyo (JP); Hajime Inoue, Chiba (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/438,630

(22) Filed: Nov. 12, 1999

(30) Foreign Application Priority Data

Nov. 17, 1998 (JP) .............................. P10-326630

(51) Int. Cl.
*H04N 5/91* (2006.01)

(52) U.S. Cl. ........................... 386/83; 725/40; 348/473

(58) Field of Classification Search .................... 386/1, 386/83, 46, 107, 117; 348/731, 732, 473, 348/14.01, 565; 725/40–41, 58, 52; 455/179.1, 455/185.1, 186.1, 185
See application file for complete search history.

(56) References Cited

U.S. PATENT DOCUMENTS

| | | | | |
|---|---|---|---|---|
| 5,353,121 A | * | 10/1994 | Young et al. ................. | 725/52 |
| 5,675,390 A | * | 10/1997 | Schindler et al. ............. | 725/52 |
| 5,949,492 A | * | 9/1999 | Mankovitz ................... | 348/473 |
| 6,177,931 B1 | * | 1/2001 | Alexander et al. ............ | 725/52 |
| 6,219,839 B1 | * | 4/2001 | Sampsell ..................... | 725/40 |
| 6,292,618 B1 | * | 9/2001 | Ohara et al. .................. | 386/46 |
| 6,292,624 B1 | * | 9/2001 | Saib et al. .................... | 386/83 |
| 6,411,771 B1 | * | 6/2002 | Aotake ........................ | 386/52 |
| 6,477,705 B1 | * | 11/2002 | Yuen et al. ................... | 725/41 |
| 6,606,747 B1 | * | 8/2003 | Yuen et al. ................... | 725/40 |
| 6,832,385 B1 | * | 12/2004 | Young et al. ................. | 386/83 |

* cited by examiner

*Primary Examiner*—James J. Groody
*Assistant Examiner*—Christopher Onuaku
(74) *Attorney, Agent, or Firm*—Lerner, David, Littenberg, Krumholz & Mentlik, LLP

(57) ABSTRACT

In a program receiver and a method of display processing of a program explanation screen, it is possible to display a reproduced program explanation screen as high-definite as a received program explanation screen when reproducing received program explanation information after recorded. Unrelated and unnecessary information is not displayed in reproduction when program explanation screen generating means for generating a received program explanation screen based on program explanation information added to the received program data is employed to generate a reproduced program explanation screen based on program explanation information added to the reproduced data. This enables efficient graphics processing and helps the user distinguish the received program explanation screen from the reproduced program explanation screen to prevent confusion.

15 Claims, 6 Drawing Sheets

PROGRAM RECEIVER AND METHOD OF DISPLAY PROCESSING OF PROGRAM EXPLANATION SCREEN

BACKGROUND OF THE INVENTION

1. Field of the Invention

The present invention relates to a program receiver and a method of display processing of a program explanation screen, and more particularly, is suitably applied to a receiver/decoder in a digital satellite broadcasting system.

2. Description of the Related Art

In digital satellite broadcast systems which have provided hundreds of programs to users, broadcast waves from the transponder of a communications satellite are received via a receiver/decoder (hereinafter referred to as integrated receiver decoder (IRD)) and program data of a selected channel is decoded so that the image and voice are outputted from a monitor.

The IRD receives program explanation information that explains the contents of programs, as well as program data of digital broadcasts such as communications satellite (CS) broadcasts, broadcasting satellite (BS) broadcasts, and ground wave broadcasts, and that, when the program explanation button on a remote control is pressed by the user, the program explanation screen is generated by applying graphics processing to the program explanation information for display on the monitor.

When recording program data and program explanation information received by the IRD, for example, a video tape, the IRD decodes received program data and program explanation information and converts those into an analog video signal, then outputs the signal, for example through a coaxial cable, to an analog video tape recorder (hereinafter referred to as the VTR) and records the signal on the video tape by the VTR.

Because the IRD having the configuration mentioned above does not have input/output ports for digital data, when the IRD uses the VTR to record received program data and program explanation information on a video tape, program data and program explanation information must be converted to an analog video signal by the IRD and recorded on the video tape by the VTR. This problem complicates the process and prevents high-definition digital recording.

SUMMARY OF THE INVENTION

In view of the foregoing, an object of this invention is to provide a program receiver and a method of display processing of program explanation screen with a simple configuration which can provide, when recording and reproducing the received program explanation information, a reproduced program explanation screen as high-definite as the received program explanation screen.

The foregoing object and other objects of the invention have been achieved by the provision of a program receiver and a method of display processing of a program explanation screen in which unrelated and unnecessary information is not displayed in reproduction when program explanation screen generating means for generating a received program explanation screen based on program explanation information added to the received program data is employed to generate a reproduced program explanation screen based on program explanation screen added to the reproduced data. This enables efficient graphics processing and helps the user distinguish the received program explanation screen from the reproduced program explanation screen and prevents confusion.

Furthermore, in reproduction, information indicating a reproduced screen in reproduction can be displayed on the reproduced program explanation screen in order to let the user know that the displayed picture is a reproduced picture. Moreover, a reproduced program explanation screen as high-definite as a received program explanation screen directly displayed in reception is generated and displayed, it is possible to provide a reproduced program explanation screen as high-definite as a received program explanation screen to the user in reproduction as well.

The nature, principle and utility of the invention will become more apparent from the following detailed description when read in conjunction with the accompanying drawings in which like parts are designated by like numerals or characters.

DETAILED DESCRIPTION OF THE EMBODIMENT

Figure 1:
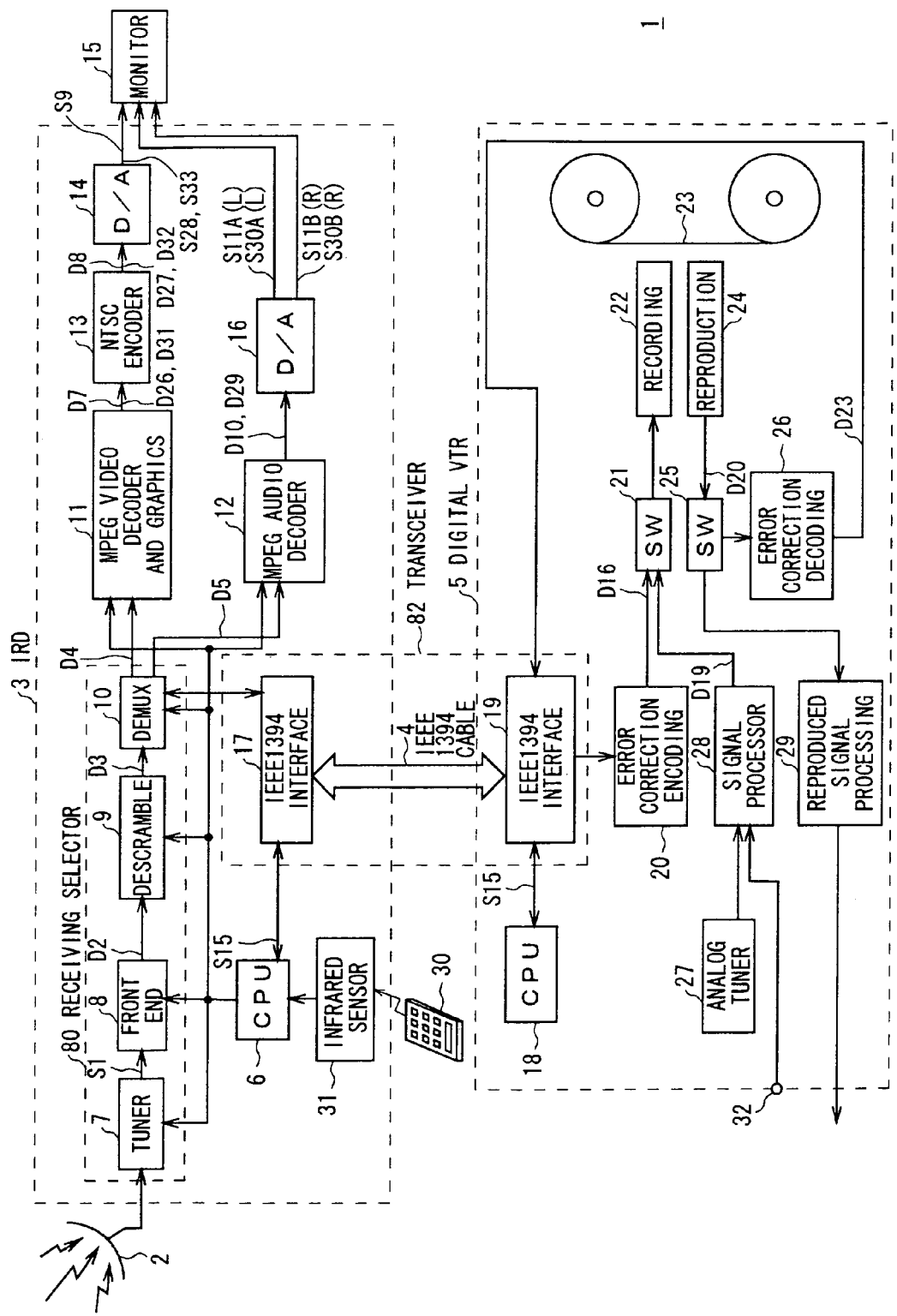
FIG. 1 is a block diagram showing the configuration of a digital data recording/reproduction system according to the present invention.

Preferred embodiments of the present invention will be described with reference to the accompanying drawings:

Referring to FIG. 1, a digital data recording/reproduction system 1 is shown as a whole, which is configured by an antenna 2, an IRD 3 as a program receiver of the present invention, an institute of electrical and electronics engineers (IEEE) 1394 cable 4, and a digital video tape recorder (hereinafter referred to as digital VTR) 5.

The digital data recording/reproduction system 1, in a reception mode where received program data is decoded in real time and directly displayed on a monitor 15, receives broadcast waves from communications satellites (not shown) via the antenna 2 and sends the waves to a tuner 7 of a receiving selector 80 in the IRD 3. In the IRD 3, each circuit operates according to the control by the CPU 6 and a received signal S1 from a transponder selected by the tuner 7 is sent to a front end 8.

The front end 8 demodulates the received signal S1, applies error correction processing to resulting received data, then sends the data as a received data stream D2 to a descramble circuit 9. The descramble circuit 9, based on the encryption key information stored in an IC card (not shown) inserted in the IRD 3 main unit, descrambles the received data stream D2, and then sends a resultant received data stream D3 to a demultiplexer 10.

The demultiplexer 10 extracts out of received data stream D3 program data of a channel specified by the user, and sends a video stream D4 comprising packets of image part of the program data to an MPEG video decoder and graphics circuit 11 while sending an audio stream D5 comprising packets of audio part to an MPEG audio decoder 12.

The MPEG video decoder and graphics circuit 11 restores video data D7 before compressed and encoded by decoding the video stream D4, then sends this to a national television system committee (NTSC) encoder 13.

The NTSC encoder 13 converts the video data D7 to an NTSC-compliant luminance signal and color difference signal and sends these signals as NTSC data D8 to a digital-to-analog converter 14. The digital-to-analog converter 14 converts the NTSC data D8 to an analog signal S9 and outputs this signal as a program picture to the monitor 15.

The MPEG audio decoder 12 restores pulse code modulation (PCM) audio data D10 before compressed and encoded by decoding the audio stream D5 and sends the data to a digital-to-analog converter 16.

The digital-to-analog converter 16 generates an L-channel audio signal S11A and an R-channel audio signal S11B by converting the PCM audio data D10 to an analog signal and outputs these signals as broadcast voice via speakers of the monitor 15 (not shown).

When a program explanation button (not shown) on a remote control 30 is pressed by the user and program explanation screen request data outputted via infrared rays from the remote control 30 is sensed by an infrared sensor 31, the IRD 3 sends the data to a CPU 6.

At this time, the CPU 6 controls the demultiplexer 10 and the MPEG video decoder and graphics circuit 11 based on the program explanation screen request data. That is, the demultiplexer 10 extracts the program explanation information stream comprising packets that contain description of the program explanation information and supplies the stream to the MPEG video decoder and graphics circuit 11 as a received program explanation generating means for graphics processing.

In this way, the MPEG video decoder and graphics circuit 11 superimposes the received program explanation screen obtained by graphics processing on the video data of the received channel to send it to the NTSC encoder 13.

Figure 2:
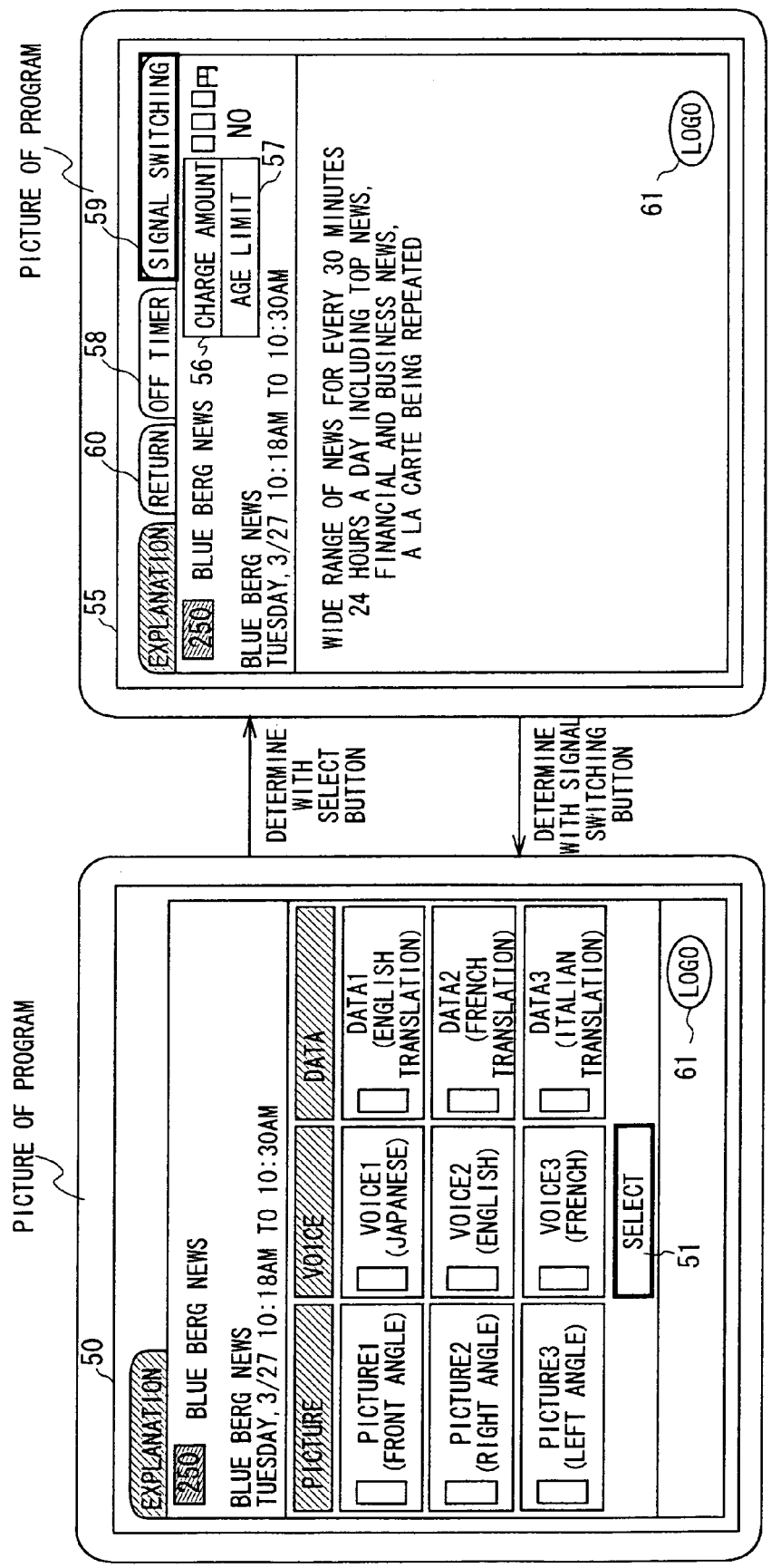
FIG. 2 is a schematic illustration showing a program explanation screen and a contents display screen.

Consequently, as shown in FIG. 2, a received program explanation screen 50 is displayed covering the picture of a program on the monitor 15 as a display means.

The received program explanation screen 50 shows that "the Blue Berg News" on channel 250 received by the IRD 3 is broadcasted, including for example Picture 1 (front angle), Picture 2 (right angle), Picture 3 (left angle), Voice 1 (Japanese), Voice 2 (English), Voice 3 (French), Data 1 (English translation), Data 2 (French translation), and Data 3 (Italian translation).

Thus a viewer identifies the received screen explanation screen 50 and selects a desired angle, voice, and translation by using the remote control 30 before pressing a select button 51. This lets the CPU 6 of the IRD 3 control the MPEG video decoder and graphics circuit 11 for graphics processing of the program explanation information stream to generate a received contents display screen 55 that provides detailed explanation on the Blue Berg News and switches from the received program explanation screen 50 to the contents display screen 55 to display on the monitor 15.

The received contents display screen 55 shows the time intervals, and the broadcasting hour of the Blue Berg News and the contents of the news. On the screen, icons 56 and 57 are displayed that indicate the presence/absence of charge amount and age limit at the right upper portion and an off timer button 58 for setting the off timer that automatically stops program reception, in the upper-center area.

Moreover, the received screen explanation screen 50 and the contents display screen 55 display a logo 61 of the broadcast provider at the right lower portion to indicate which broadcast provider is broadcasting the Blue Berg News.

When the viewer selects a signal switching button 59 on the received contents display screen 55, the CPU 6 of the IRD 3 controls the MPEG video decoder and graphics circuit 11 to return to the received program explanation screen 50. When the viewer selects a return button 60 on the received contents display screen 55, the CPU 6 of the IRD 3 controls the MPEG decoder and graphics circuit 11 to return the display on the monitor 15 from the received contents display screen 55 to the program picture.

Figure 3:
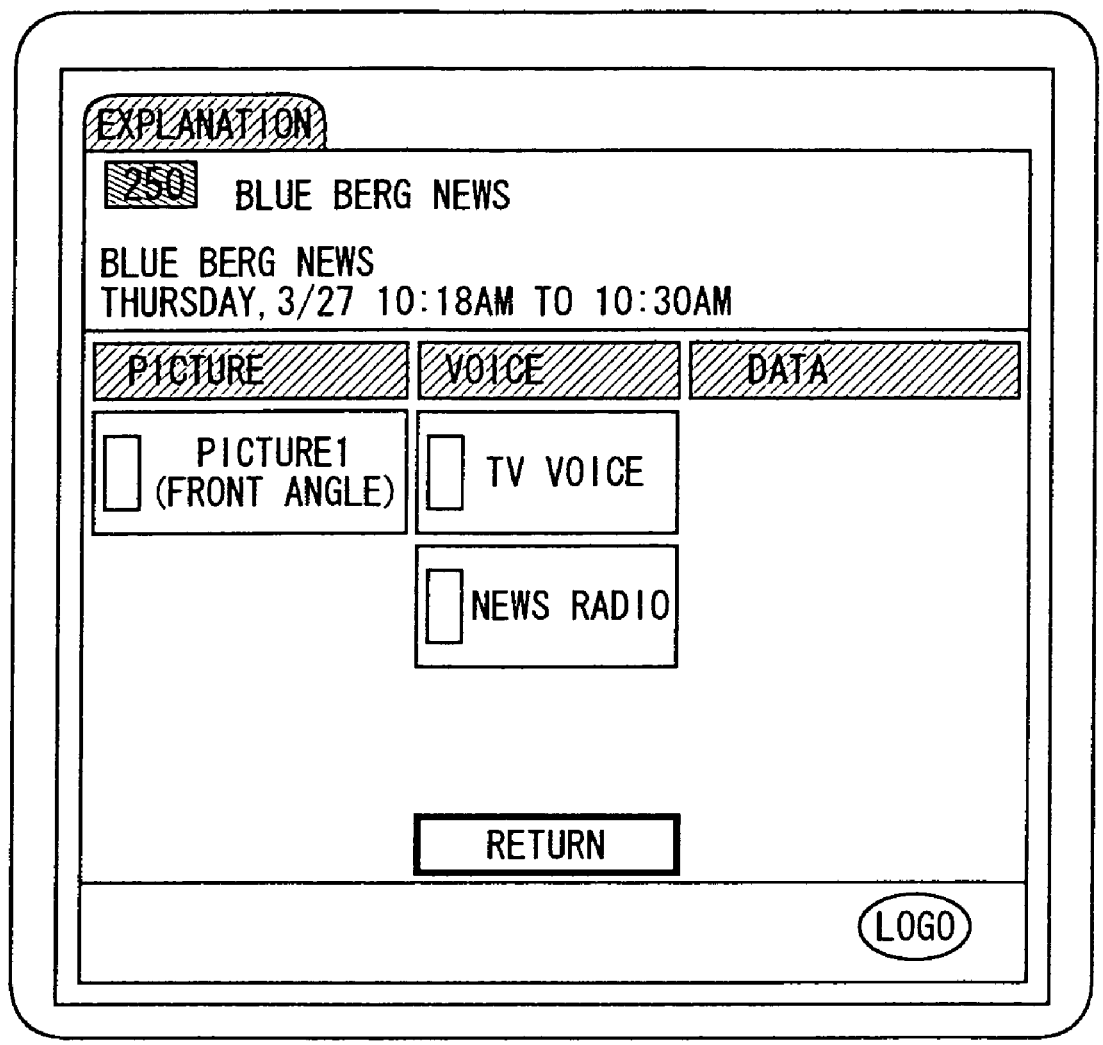
FIG. 3 is a schematic illustration showing the actual display example of a program explanation screen 1.
Figure 4:
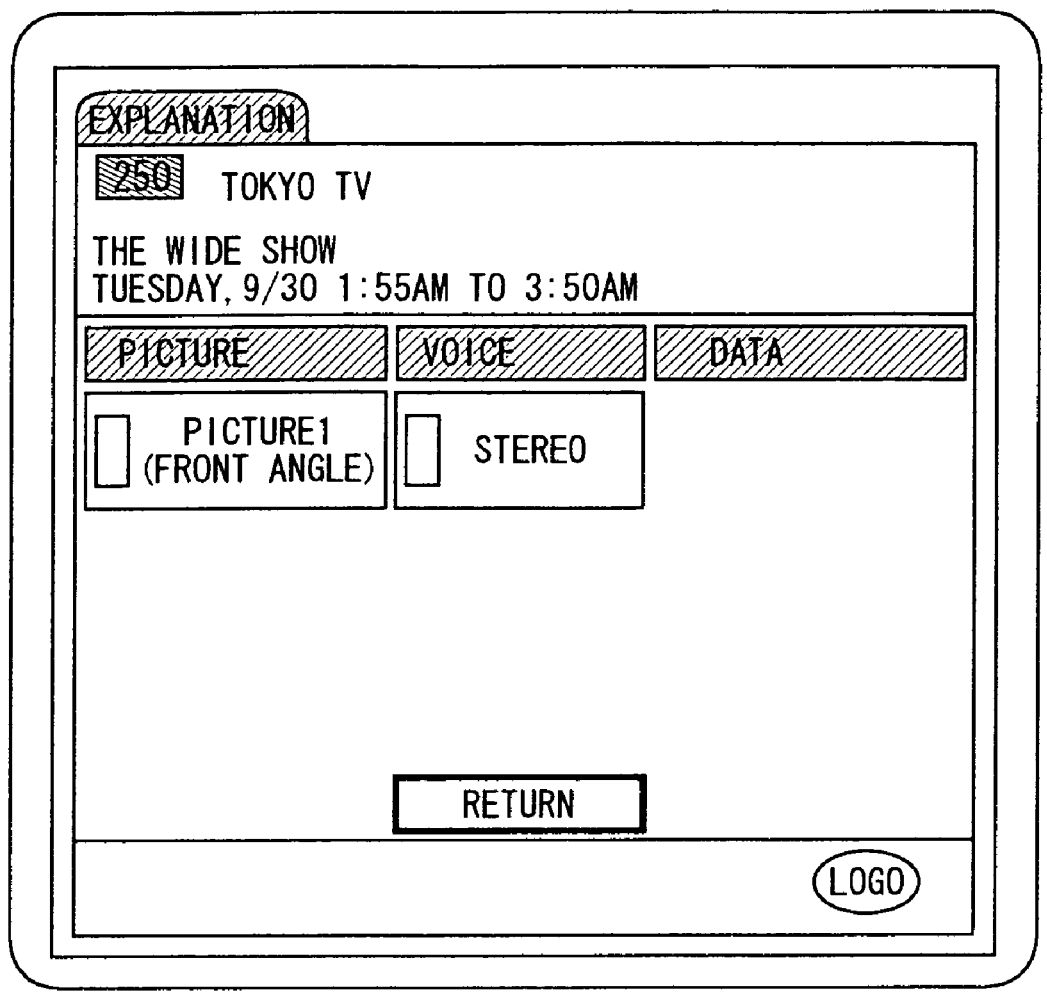
FIG. 4 is a schematic illustration showing the actual display example of a program explanation screen 2.

Actually, on the received program explanation screen 50, Picture 1 is broadcasted as one type of picture and TV Voice and NEWS RADIO as two types of voice in "the Blue Berg News" on Channel 250 as shown in FIG. 3. And Picture 1 is broadcasted as one type of picture and STEREO as one type of voice in "the Tokyo TV: The Wide Show" on channel 210, as shown in FIG. 4.

Next, in the digital data recording/reproduction system 1, in a recording mode where received program data is sent to the digital VTR 5 to be recorded on a video tape 23, the demultiplexer 10 sends a stream containing video packets, audio packets, and additional information packets of the program to be recorded to an IEEE1394 interface 17 of a transceiver 82.

Once recording of program data is instructed by the operation of the remote control 30 of the user, the CPU 6 generates recording control data S15 that controls recording operation of the digital VTR 5 and sends the data to the IEEE1394 interface 17.

The IEEE1394 interface 17 sends the streams received from the demultiplexer 10 to an error correction encoding circuit 20 via the IEEE1394 cable 4 and an IEEE1394 interface 19 of the digital VTR 5 while sending the recording control data S15 to a CPU 18 via an IEEE1394 cable 4 and the IEEE1394 interface 19.

In the digital VTR 5, each circuit operates based on the control by the CPU 18. The error correction encoding circuit 20 adds error correction codes to the stream received from the IEEE1394 interface 19 based on the recording control data S15.

The stream D16 to which the error correction codes are added is sent to recording system 22 via a switch circuit 21. The recording system 22 comprises a magnetic head that records the stream D16 to which error correction codes are added on the video tape 23 as a recording medium.

In other words, the digital VTR 5 also records packets having additional information such as program explanation information on the video tape 23, by adding error correction codes to the stream received from the IEEE1394 interface 19 before recorded on the video tape 23.

The stream to be recorded must include the additional information such as program association table (PAT) associated with the program to be recorded, program map table (PMT), network information as to the broadcast provider of the program to be recorded, copyright information, information indicating the stream is a partial transport stream, and information indicating unsuccessive points of the stream.

Additional information to be optionally recorded includes the title of program data to be recorded, program explanation information on the program data to be recorded according to the present invention, broadcast time information of the program to be recorded (e.g., one-hour broadcast from 12:00, Oct. 23, 1998), and age limit information of the program etc.

By the way, additional information that is not recorded includes conditional access (CA) information as key information for descrambling, various table information provided by broadcasts other than PAT/PMT, such as network information table (NIT), service description table (SDT), event information table (EIT), conditional access table (CAT), and time description table (TDT), and streams that have not been descrambled yet.

The digital VTR 5 can record video signals inputted not via the IRD 3 but via an analog tuner of a television (not shown) to an external input terminal 32 and also can record audio and video signals received by the analog tuner 27.

The audio and video signals supplied from the analog tuner 27 or the external input terminal 32 undergoes signal processing by a signal processor 28, and those signals are sent to a recording system 22 via the switch circuit 21. The recording system 22 analog-records the signals from the signal processor 28 on the video tape 23.

Next, in a reproduction mode where the stream recorded via the digital VTR 5 on the video tape 23 are reproduced, the digital data recording/reproduction system 1 obtains a reproduced encoded stream D20 by playing back the video tape 23 by a reproduction system 24 having a magnetic head, and sends the stream to an error correction decoding circuit 26 via a switch circuit 25.

The error correction decoding circuit 26 applies error correction decoding processing to the reproduced encoded stream D20, then sends the stream as a stream D23 to the IEEE1394 interface 19.

The IEEE1394 interface 19, based on control by the CPU 18, supplies the video stream D23 from the IEEE1394 cable 4 to the demutiplexer 10 via IEEE1394 interface 17 of the IRD 3. The demutiplexer 10 supplies video packets to the MPEG video decoder and graphics circuit 11 with reference to the PID of the packets in the stream D23 received from the IEEE1394 interface 17, while supplying audio packets to the MPEG audio decoder 12.

The MPEG video decoder and graphics circuit 11 restores the reproduced video data D26 before compressed and encoded by decoding the video packets supplied from the demultiplexer 10 based on control by the CPU 6, then sends the data to the NTSC encoder 13.

The NTSC encoder 13 converts the reproduced video data D26 to the NTSC-compliant luminance signal and color difference signal and sends these signals to the digital-to-analog converter 14 as reproduced NTSC data D27. The digital-to-analog converter 14 converts the reproduced NTSC data D27 to an analog signal S28 and outputs this signal as a reproduced picture to the monitor 15.

The MPEG audio decoder 12 restores PCM audio data D29 before compressed and encoded by decoding the audio packets supplied from the demultiplexer 10 under control by the CPU 6 and sends the data to the digital-to-analog converter 16.

The digital-to-analog converter 16 generates an L-channel audio signal S30A and an R-channel audio signal S30B by converting the PCM audio data D29 to an analog signal, and outputs those signals as voice through the speakers of the monitor 15 (not shown).

When the program explanation button (not shown) on the remote control 30 is pressed by the user during reproduction and program explanation screen request data via infrared rays from the remote control 30 is sensed by the infrared sensor 31, the IRD 3 sends the data to the CPU 6.

At this time, the CPU 6 controls the demultiplexer 10 and MPEG video decoder and graphics circuit 11 according to the program explanation screen request data, and supplies packets in which program explanation information is described as additional information out of the stream received via the IEEE1394 interface 17 to the MPEG video decoder and graphics circuit 11.

The MPEG video decoder and graphics circuit 11 generates program explanation screen data D31 for reproducing by applying graphics processing to the program explanation information in the packets, and superimposes the data on the reproduced video data D26. This superimposed data is sent to the NTSC encoder 13.

The NTSC encoder 13 converts the superimposed signal to an NTSC-compliant luminance signal and color difference signal, then sends these signals as reproduced NTSC data D32 to the digital-to-analog converter 14. The digital-to-analog converter 14 converts the reproduced NTSC data D32 to a reproduced analog signal S33 and displays the signal as a reproduced program explanation screen 70 shown in FIG. 5, on the monitor 15.

At this time the reproduced program explanation screen 70 is displayed on the monitor 15 as a graphical user interface (GUI) screen that is nearly the same as the received program explanation screen 50 (FIG. 2) when broadcast data is displayed in real time. However, the reproduced program explanation screen 70 has the display of character 71 that reads "Under Reproduction" at the right upper portion of the reproduced program explanation screen 70 as well as the logo 78 of the broadcast provider so that the user can easily discriminate the received program explanation screen 50 on broadcast data being displayed in real time from the reproduced program explanation screen 70.

When a select button 72 is pressed by the viewer on the reproduced program explanation screen 70, the CPU 6 of the IRD 3 generates a reproduced contents display screen 75 that provides explanation of specific contents of the Blue Berg News by using the MPEG video decoder and graphics circuit 11 to apply graphics processing, then switches from the reproduced program explanation screen 70 to the reproduced contents display screen 75 which is displayed on the monitor 15.

On the reproduced contents display screen 75, the CPU 6 also displays character 76 that reads "Under Reproduction" at the right upper portion of the reproduced program explanation screen 75 as well as the logo 77 of the broadcast provider. The CPU 6 does not display icons that indicate the presence/absence of the charge amount and age limit and an off timer button for setting the off timer that automatically stops the reception on the reproduced contents display screen 75, but does display the logo 77 of the broadcast provider at the right lower portion.

This represents that it is not necessary, when the digital VTR is in reproduction, to provide icons indicating the presence/absence of the charge amount and age limit and the off timer button for setting the off timer that automatically stops the reception, and therefore those are not displayed in order to prevent the user from being confused.

Figure 6:
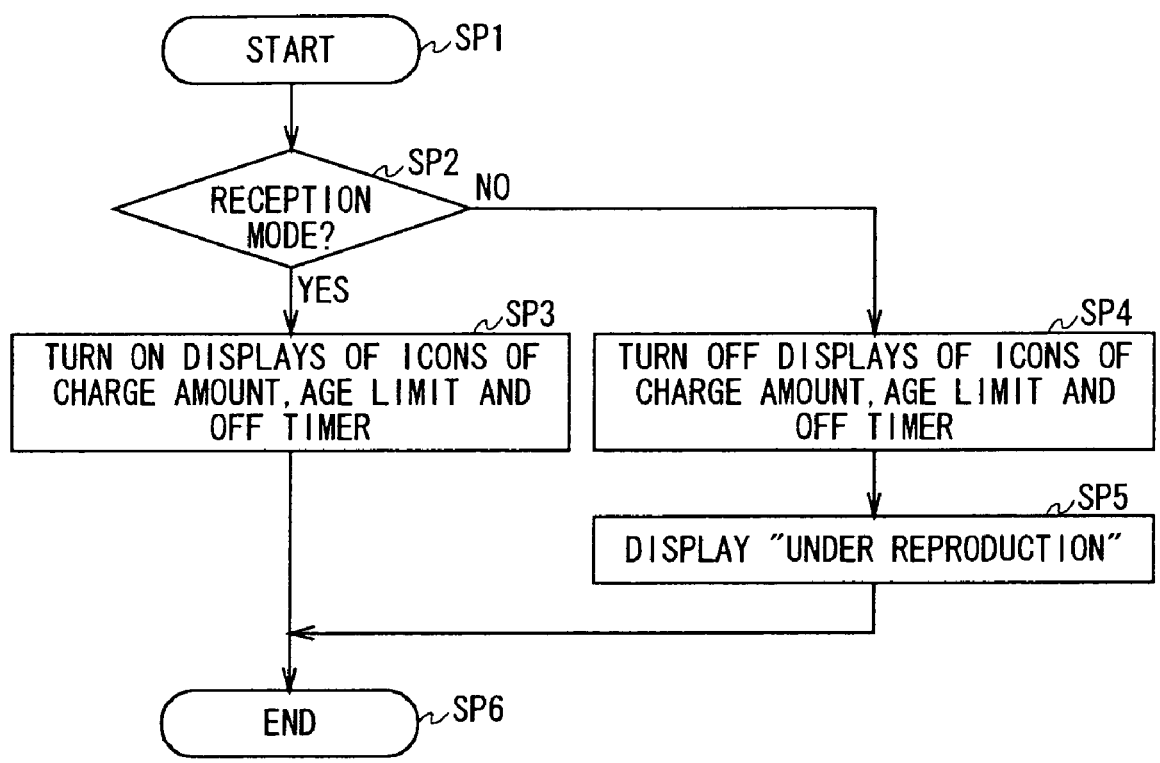
FIG. 6 is a flow chart showing the processing procedure of the CPU when displaying the received program explanation screen and the reproduced program explanation screen.

FIG. 6 is a flow chart showing the processing procedure of the CPU 6, which starts with step SP1 and proceeds to step SP2. In step SP2, the CPU 6 determines whether the current mode is a reception mode. After determining it is the reception mode the CPU 6 proceeds to step SP3 and controls the MPEG video decoder and graphics circuit 11 to turn on the displays of charge amount icon 56, age limit icon 56 and off timer button 58.

On the contrary, if the CPU 6 determines it is not in the reception mode in step SP2 (that is, it is in the reproduction mode), it proceeds to step SP4, and controls the MPEG video decoder and graphics circuit 11 to turn off the displays of charge amount icon 56, age limit icon 56 off timer button 58.

After that, the CPU 6 proceeds to step SP5 and controls the MPEG video decoder and graphics circuit 11 to display "under reproduction" and then proceeds to step SP6 to finish the processing.

In the above configuration, in the recording mode, the IRD 3 sends concerning the program of a specified channel and a stream comprising video part packets and voice part packets concerning the program of a specified channel to the digital VTR 5 through the IEEE1394 cable 4 and which are digital-recorded on the video tape 23.

At this time, the packets where program explanation information is described as additional information are also digital-recorded on the video tape 23.

In the reproduction mode, the stream reproduced from the video tape 23 is sent back to the MPEG video decoder and graphics circuit 11 and the MPEG audio decoder 12 via the IEEE 1394 cable 4 and the demultiplexer 10.

When the program explanation button on the remote control 30 is pressed by the user, the IRD3, similarly to in the reception display mode, uses the MPEG video decoder and graphics circuit 11 to apply graphics processing to the program explanation information in packets where program explanation information is described as additional information in the stream D23 sent back from the digital VTR 5, then displays the information as the reproduced program explanation screen 70.

In this way, the IRD 3 is connected to the digital VTR 5 by the IEEE1394 cable 4 and uses the MPEG video decoder and graphics circuit 11 in common to apply graphics processing to the program explanation information both in the reception mode and reproduction mode. Thus, the graphics processing can be performed efficiently by minimizing the differences between the processing in the reception mode and in the reproduction mode. In addition, as the program explanation information is digital-recorded on a video tape, the reproduced program explanation screen 70 (FIG. 5) can be displayed on the monitor 15 as the GUI screen as high-definite as the received program explanation screen 50 (FIG. 2).

The digital data recording/reproduction system 1 allows the user to easily discriminate the reproduced program explanation screen 70 and the reproduced contents display screen 75 from the received program explanation screen 50 and the received contents display screen 55 (FIG. 2) which are all displayed as the same GUI screen both in the reception display mode and the reproduction mode, by displaying the characters 71 and 76 "under reproduction" at the right upper portion of the reproduced program explanation screen 70 and the reproduced contents display screen 75 (FIG. 5) which are displayed as the GUI screen in the reproduction mode on the monitor 15.

According to the above configuration, graphics processing can be performed efficiently by minimizing the differences between the reproduced program explanation screen 70 and the received program explanation screen 50.

Figure 5:
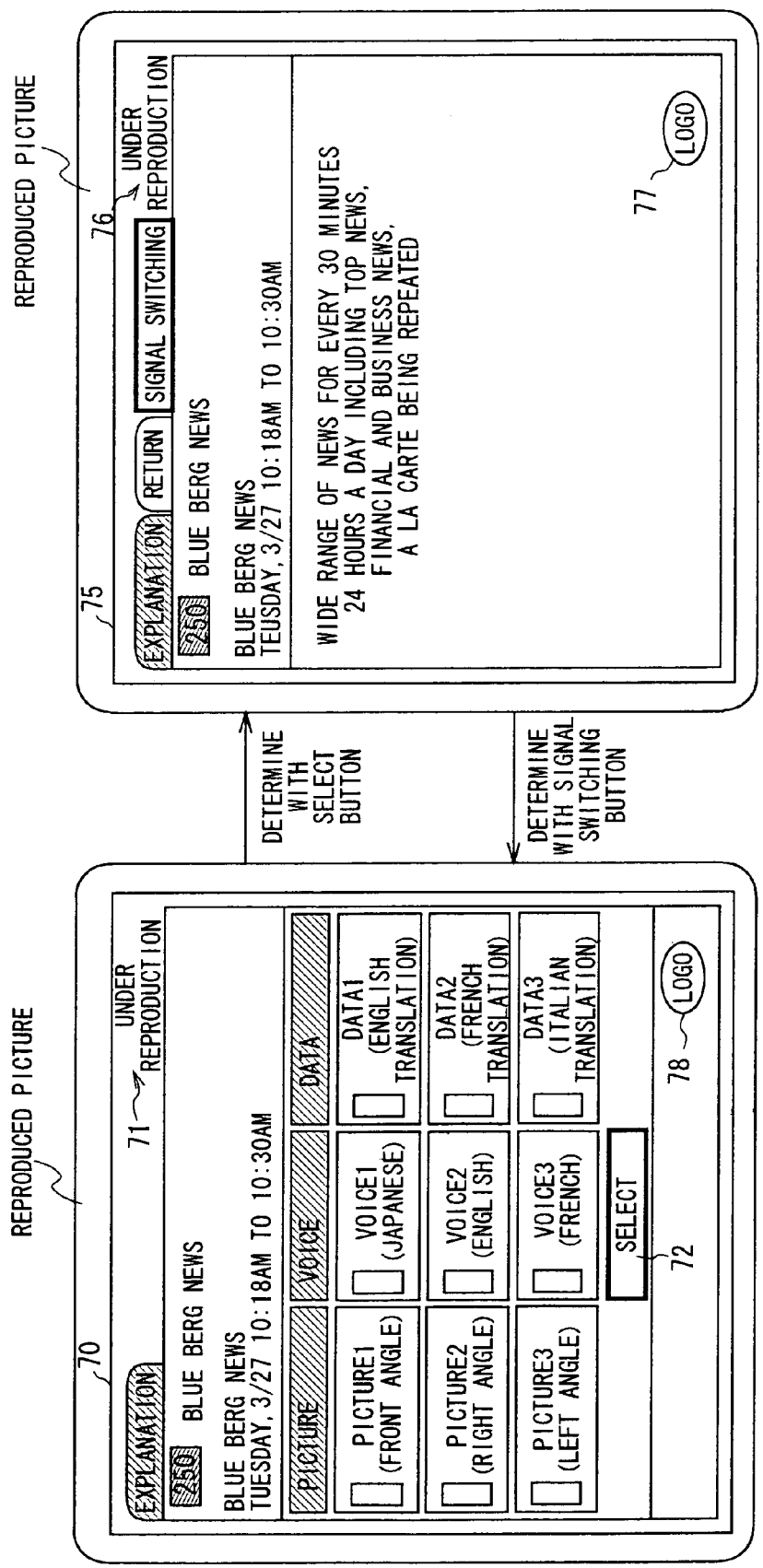
FIG. 5 is a schematic illustration showing the reproduced program explanation screen and the reproduced contents display screen.

In the above embodiment, it has described a case where the characters 71 and 76 "Under Reproduction" are displayed at the right upper portion of the reproduced program explanation screen 70 and reproduced contents display screen 75 (FIG. 5). However, the present invention is not restricted to this case. Various indication displays of reproduction such as characters "Reproduced Picture" or a vide tape mark can be used as long as such characters let the user easily recognize the reproduced program explanation screen 70 and the reproduced contents display screen 75 obtained by playing back the video tape 23.

Further in the above embodiment, it has described a case where the digital data recording/reproduction system 1 sends the stream from the IRD 3 to the digital VTR 5 through the IEEE1394 cable 4, and records the stream on the video tape 23. However, the present invention is not restricted to this case. Recording can be made on a predetermined recording medium via various other recording/reproduction means, such as recording on a magneto-optical disk loaded in a magneto-optical disk recording/reproduction apparatus.

Further, in the above embodiment, a stream in which audio packets, video packets and additional information packets are multiplexed is recorded in the digital VTR 5. However, it is possible to record a stream in which audio packets and additional information packets are multiplexed on a magneto-optical disk such as a mini disk (trademark) and a compact disc recordable (CD-R) for instance.

Further in the above embodiment, it has described a case where a stream is sent to the digital VTR 5 via the IEEE1394 interface 17, the IEEE1394 cable 4 and the IEEE1394 interface 19 as transmission/reception means. However, the present invention is not restricted to this case. Radio transmission/reception means can also be used as long as digital data can be sent at high speed.

As mentioned above, according to the present invention, the program explanation screen generating means for generating a received program explanation screen based on the program explanation information added to the received program data is used to generate the reproduced program explanation screen based on the program explanation information added to the reproduced data, and when displaying a reproduced program explanation screen, information unrelated and unnecessary for reproduction is not displayed. Thus it is possible to prevent confusing the user.

Also, during reproduction, information for identifying the reproduced screen is displayed on the reproduced program explanation screen, which facilitates identifying of the currently-displayed picture as the reproduced picture by the user. Moreover, by generating and displaying a reproduced program explanation screen which is as high-definite as that the received program explanation screen directly displayed in reception, it is possible to provide a reproduced program explanation screen as high-definite as the received program explanation screen to the user in reproduction as well.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A television signal receiver comprising:
   (a) a receiver section for receiving digital television signals;
   (b) a digital interface for receiving digital television signals reproduced and transmitted from an external storage device; and
   (c) an on-screen display processor for generating on-screen displays from the digital television signals received from the receiver section and from the external storage device, the on-screen display processor being adapted to generate a received program explanation screen including at least one of title of program, start/end time and program selection option by the viewer for the currently received program, a received contents display screen including a description of the contents of the currently received program, a reproduced program explanation screen including at least one of title of program, start/end time and program selection option by the viewer for a program reproduced by the external storage device, and a reproduced contents display screen including a description of the contents of the program reproduced by the external storage device, the received program explanation screen and the received contents display screen being superimposed on the television program being received by the receiver, and the reproduced program explanation screen and the reproduced contents display screen being superimposed on the television program being reproduced and transmitted by the external storage device, and wherein the reproduced program explanation screen and the reproduced contents display screen each include at least one additional indicia element indicating that the program being viewed is being reproduced from the external storage device as opposed to a program currently being received from the broadcast television programming.

2. The television signal receiver according to claim 1, wherein the received program explanation screen and the reproduced program explanation screen are visually identical in layout on the screen but for the at least one additional indicia element to allow the viewer to distinguish between the program explanation screens.

3. The television signal receiver according to claim 1, wherein the digital television signals received by the receiver section include television program guide information.

4. The television signal receiver according to claim 3, wherein the digital television signals reproduced and transmitted from the external storage device include television program guide information.

5. The television signal receiver according to claim 4, wherein the on-screen display processor processes the television program guide information included in the reproduced digital television signals to generate the the reproduced program explanation screen and the reproduced contents display screen and omits user selections previously displayed in the received program explanation screen and the received contents display screens which are no longer valid user selections when viewing the television program being reproduced and transmitted by the external storage device, from the television program guide information.

6. The television signal receiver according to claim 1, wherein the received program explanation and received contents display screens are overlaid on the television program currently received and the reproduced program explanation and reproduced contents display screens are overlaid on the television programming transmitted by the external storage device.

7. The television signal receiver according to claim 1, wherein the program selection option comprises one or more of picture angle, program language and translation data.

8. A method of displaying on-screen display signals comprising:

(a) receiving digital television signals in a television receiver;

(b) receiving digital television signals reproduced and transmitted from an external storage device in the television receiver via a digital interface;

(c) generating a received program explanation screen including at least one of title of program, start/end time and program selection option by the viewer for the currently received program, a received contents display screen including a description of the contents of the currently received program, the received program explanation screen and the received contents display screen being superimposed on the television program being received by the receiver; and (d) generating a reproduced program explanation screen including at least one of title of program, start/end time and program selection option by the viewer for a program reproduced by the external storage device and a reproduced contents display screen including a description of the contents of the program reproduced by the external storage device, the reproduced program explanation screen and the reproduced contents display screen being superimposed on the television programming being reproduced by the external storage device, and wherein the reproduced program explanation screen and the reproduced contents display screen each include at least one additional indicia element indicating that the program being viewed is being reproduced from the external storage device as opposed to a program from currently being received from the broadcast television programming.

9. The method according to claim 8, wherein the received program explanation screen and the reproduced program explanation screen are visually identical in layout on the screen but for the at least one additional indicia element to allow the viewer to distinguish between the program explanation screens.

10. The method according to claim 8, wherein the digital television signals received by the receiver include television program guide information.

11. The method according to claim 10, wherein the digital television signals reproduced and transmitted from the external storage device include television program guide information.

12. The method according to claim 11, further comprising processing the television program guide information included in the reproduced digital television signals to generate at least one of the reproduced program explanation screen and the reproduced contents display screen and omit user selections previously displayed in the at least one of the received program explanation screen and the received contents display screens that are no longer valid user selections when viewing the television program being reproduced by the external storage device.

13. The method according to claim 8, wherein the program selection option comprises one or more of picture angle, program language and translation data.

14. A method of displaying on-screen displays comprising:

(a) generating a received program explanation screen and a received contents display screen including a description of the contents of the currently selected program by a receiver upon user request when the receiver is currently receiving broadcast television programming, the received program explanation screen including a first set of user selection indicia elements representing valid user selections related to one or more program selection options for the television programming currently received by the receiver;

(b) generating a reproduced program explanation screen and a reproduced contents display screen including a description of the contents of the program reproduced by the external storage device, by the receiver upon user request when the receiver is currently receiving television program transmitted by the external storage device connected to the receiver via a digital interface, the reproduced program explanation screen including a second set of user selection indicia elements representing valid user selections related to one or more program selection options for the television program transmitted by the external storage device to the receiver, wherein the reproduced program explanation screen and the reproduced contents display screen each include at least one additional indicia element indicating that the program being viewed is being reproduced from the external storage device as opposed to a program from currently being received from the broadcast television programming.

15. The method according to claim 14, wherein the program selection options comprises one or more of picture angle, program language and translation data.

* * * * *